Patented Sept. 21, 1937

2,093,715

UNITED STATES PATENT OFFICE 2,093,715

PRIMING COATING

Carleton Ellis, Montclair, N. J., assignor to Ellis-Foster Company, a corporation of New Jersey No Drawing. Application February 3, 1930,
Serial No. 425,720

12 Claims. (Cl. 91—68)

This invention relates to the production of compositions suitable for use in or as primer coatings, and relates particularly to the production of a primer coating suitable for use under various types of superposed coatings, such as oil paints, enamels, varnishes and coatings containing cellulose derivatives, such as the esters, ethers, etc. of cellulose including nitrocellulose, paints, enamels and lacquers.

Heretofore it has been the practice to utilize as primers for wood or metallic surfaces, paint compositions consisting of a pigment and vehicle, the pigment consisting largely of silica or similar hard filler and the vehicle consisting of linseed and other drying oils either with or without the addition of natural resins and volatile solvents. This type of priming composition has been used on surfaces where oil paints and varnishes are to be subsequently applied, in order to provide smooth and even surfaces. Priming compositions of this type have been used not only for oil painted or varnished surfaces but also where nitrocellulose lacquers and lacquer enamels are to be applied. They have been more or less unsatisfactory for use under nitrocellulose coatings due to the action of the thinners used in the preparation of nitrocellulose compositions. These thinners are strong solvents and are liable to disturb and mar the undercoat. The oil primer coatings also require a long drying period as otherwise they cannot be used under other coatings due to the action of the solvents.

By the employment of synthetic resins a new and improved type of priming composition can be made which adheres well to both wood and metallic surfaces, is flexible and yet hard and tough, dries quickly and is not readily softened or affected by subsequent application of oil paints and varnishes or nitrocellulose lacquers, paints or enamels. This is a distinct improvement over the usual type of priming composition.

Priming compositions including those containing nitrocellulose as heretofore made and used have not been satisfactory because this type of primer lacks proper adhesion, and also did not fill in the pores or hollow places in the surface of the object to be primed. This is characteristic of nitrocellulose compositions, and it is well known that these compositions show all the irregularities of surface coated, while ordinary oil primers fill the pores and smooth out all such irregularities.

By the present invention improved priming compositions can be made which have great adhesion for both wood and metallic surfaces, dry quickly and which yield very smooth surfaces, filling in all pores and depressions fully as well as the usual oil primer. Thus, the improved primer may be used either for nitrocellulose lacquers and enamels or for ordinary paints and varnishes, and are not marred by application of these materials as are the oil primers.

The use of synthetic resins in suitable proportions in the preparation of priming compositions produces the much desired results, and by such use I have produced new and improved priming compositions. The resins themselves may be used as such priming compositions, or they may be utilized with nitrocellulose or other additions. When nitrocellulose is utilized together with the synthetic resins in the production of the priming compositions, it has been found that if the quantity of resin used be sufficiently in excess of the amount of nitrocellulose, the coatings made therefrom will have improved adhesion and flow and will fill in all pores and irregularities fully as well as the oil primers. Natural resins also may be used where their objectionable features can be overcome. In general it has been found advantageous to utilize a natural resin when employed in conjunction with a suitable synthetic resin, the amount of natural resin not being sufficient to militate against the desirable properties of the synthetic resin. When desired softeners such as castor oil, diethylphthalate, benzoic glyceride, triphenyl or tricresyl phosphates, camphor and the like may be utilized. The addition of compounds of this nature are within the scope of this invention.

Among the synthetic resins which are suitable are the glycerol polybasic acid resins and the glycerol mixed acid resins and in particular reference may be made to the following: rosin phthalic glyceride, congo phthalic glyceride, rosin congo phthalic glyceride, benzoic phthalic glyceride, salicyclic phthalic glyceride, phthalic glyceride, linseed phthalic glyceride, cottonseed phthalic glyceride, linseed rosin phthalic glyceride, etc. These resins may be made from glycerol and the corresponding acids, or in place of glycerol other polyhydric alcoholic ingredients may be utilized including polyglycerol, glycols, chlorhydrins, etc. As indicated the glycerol polybasic acid resins may include resins produced with natural resins including the type rosin phthalic glyceride and also linseed rosin phthalic glyceride referred to above. One of the ingredients entering into the polyhydric alcohol polybasic acid type of resins may be the natural glycerides, such as the vegetable oils, particularly linseed, wood, cocoanut, castor, etc. including drying, semi-drying or non-drying oils, or the fatty acids of such oils. In some cases a natural resin such as dammar and rosin ester may be utilized.

Various pigments and fillers may be used according to color, hardness and other properties desired. As in oil primers it is usually best to have a pigment portion rather high in silica or other similarly hard filler. The silica or other agent or pigment employed to assist in giving a filling effect in the priming coating is referred to hereinafter as an extending agent.

Various softeners may be used but must be selected according to the resin utilized, for example with rosin phthalic glyceride resin a castor oil softener may be used successfully but this softener cannot be used with phthalic glyceride and another softener such as diethylphthalate must be used instead. The usual nitrocellulose solvents are employed and are adjusted to give quick drying and to produce a non-blushing film.

One particular priming composition which has given good results is made as follows:

15 parts (by weight) rosin phthalic glyceride resin
2 parts castor oil
5 parts nitrocellulose
2 parts zinc oxide
½ part silex
20 parts butyl acetate
30 parts ethyl acetate
50 parts benzol The composition is ground in a ball mill for at least 10 hours. The proportion of resin to nitrocellulose may be varied if desired but preferably should not be less than two parts of resin to one of nitrocellulose. In the above formula three parts by weight of the rosin phthalic glyceride are used to one part of nitrocellulose, and good results may be obtained by using a ratio of one part of nitrocellulose to four of the resin, or even a higher proportion of the latter. Generally speaking at least three parts of resin to one part of nitrocellulose is desired.

Other glycerol polybasic or mixed acid resins may be used in place of the rosin phthalic glyceride if desired and in some cases a percentage of natural resin may also be incorporated. Other softeners may be used and solvents modified or changed where deemed of advantage.

This application is a continuation of a series of applications for patents which I have filed in the past relating to nitrocellulose and synthetic resins compatible therewith employed in coating compositions.

Thus in Ellis application, Serial No. 740,141, filed September 26, 1924, entitled "Primer containing synthetic products", now Patent No. 1,745,893, patented February 4, 1930, there is described and claimed the use of the phthalic glyceride type of synthetic resins, particularly when modified by the inclusion of the monobasic acids, used as a primer coating on an article of manufacture. And in Ellis application, Serial No. 61,839, filed October 10, 1925, entitled "Resinous products or compositions and process of making same", there is described and claimed these phthalic glyceride resins, particularly when produced by the inclusion of natural resins in the complex, together with monobasic fatty acids, the acids from drying oils and other glyceride oils, and the glyceride oils themselves, as well as the use of blown oils in the production of these resinous products.

The present invention in its broader aspects involves the employment of such coating compositions for priming purposes including the process of priming a surface of wood, steel or other metal with such compositions to form an adherent coating on which the requisite protective or decorative finish may be built up. In the more specific aspects of the present invention the employment of compositions containing a relatively high proportion of synthetic resin with respect to nitrocellulose is involved. The use of such high proportions for example three or four parts or more of resin to one part of nitrocellulose affords a product of utility for priming purposes which might not be advantageous if used in other ways. The nitrocellulose employed may be of any appropriate type such as ordinary soluble cotton, celluloid pyroxylin, gun cotton, gelatinized cotton, celluloid and waste celluloid scrap or film. The synthetic resin must be one which will blend satisfactorily and be entirely compatible with the nitrocellulose when employed in such proportions. There are various resins which when employed in relatively small amounts will mix with nitrocellulose but as soon as any large proportion of the resin is employed very brittle and unsatisfactory coatings result. The high degree of compatibility with nitrocellulose possessed by the glycerol organic acid type of resins and especially those containing two or more organic acids combined with the glycerol render these especially applicable to the purposes of the present invention and constitute a preferred embodiment.

A still more specific feature is that of employing a complex resin from glycerol and two or more organic acids, one of which is a dibasic acid such as phthalic acid or anhydride and the other is a monobasic acid such as benzoic or salicylic acid. These complex products have a very desirable blending action and possess physical properties in other ways highly appropriate.

The resins and complexes produced with the glycerides, such as the animal and vegetable oils, and particularly with the fatty acids obtained from such oils, are eminently suited for use in priming compositions with or without nitrocellulose. For example, the fatty acids utilized and derived from the oils include those obtained from the drying, semi-drying, and non-drying oils, such as linseed, tung, castor, cottonseed, cocoanut, etc. The fatty acid complexes derived from such oils by saponification and subsequent acidifying may thus be utilized in producing complexes by reaction with an organic acid, such as phthalic acid, or its equivalent including monobasic, dibasic and polybasic organic acids, such as succinic, tartaric, lactic, citric, malic, maleic, fumaric, benzoic, salicylic, camphoric, phenic, naphthenic, and the like, and a third ingredient including a polyhydric alcohol or its equivalent, such as glycerol, polyglycerol, the glycols, etc. Instead of using the fatty acid complexes derived by saponification from the oils, the individual acids or mixtures of such acids may also be utilized in producing such complexes.

The following is an example of producing a linseed phthalic glyceride resin: A mixture of glycerol 94 parts by weight, phthalic anhydride 160 parts, fatty acids of linseed oil 80 parts, are heated to 250° C. for about 2 hours. A light brown resin with an acid number of 20.2 is obtained which exhibits compatibility with nitrocellulose, and is soluble, for example, in butyl acetate.

The following example of a cottonseed phthalic glycerine resin is given. 94 parts glycerol, 160 parts phthalic anhydride, and 80 parts fatty acids of cottonseed oil are heated to about 240° C. for approximately 4 hours. A light brown resin having an acid number of 22.4 and compatible with nitrocellulose and soluble in butyl acetate is obtained.

The following example of a castor oil resin utilizing glycols is given. A mixture of about equal parts of ethylene and propylene glycols 104 parts, phthalic anhydride 160 parts, castor oil 80 parts, are heated to about 240° C. in about 1 and ½ hours. A pale, soft, sticky resin of acid number 15.3 is obtained. It is soluble in butyl acetate and is compatible with nitrocellulose.

Examples of resins produced with the natural resins such as rosin, dammar, etc. have been referred to above. The natural resins, such as rosin, which are acid in character, may thus be utilized and combined into the complex of the drying oil and semi-drying oil and other oil acid resins referred to above, so that the natural resin becomes intimately incorporated into the complex and an intimate constituent thereof. The proportions of such natural resins which are utilized should not be sufficient to destroy the particular properties desired in the drying oil acid resins, for example.

The following example utilizing fatty acids derived from castor oil is given: glycerol 47 parts, phthalic anhydride 90 parts, crude ricinoleic acid 30 parts. The ricinoleic acid was obtained by completely saponifying castor oil with an alkali and then acidifying and washing. The reaction was carried out in a vessel equipped with a reflux condenser and provided with an agitator. Heat was applied gradually, the temperature being raised to 260° C.; the entire time of reaction being approximately 1 hour. A light colored, hard and rather tough resin was obtained.

Similarly ricinoleic acid itself rather than the crude product obtained by saponifying castor oil, for example, may be utilized in producing these resins, as well as the other specific higher fatty acids obtained from the various oils referred to.

The ingredients may be reacted simultaneously as indicated in the examples given above, or two or more stage reactions may be utilized. For example, the glycerol and phthalic anhydride may first be heated in corresponding proportions to approximately 230° C. and before polymerization has set in, ricinoleic acid may then be added and the heating continued up to from 260 to 270° C. or even higher to obtain the final complex.

As indicated above, the priming compositions may be used to produce priming coatings, either utilizing the resins above described, or by the inclusion of such resins with other additions including the cellulose esters, such as nitrocellulose, etc. The primer coatings thus obtained may be dried or baked prior to the application of overcoats. For example, such coatings may be dried in an oven at 50° C. or the article may be placed in a heated room at a temperature of approximately 50° C. Similarly the coatings may be baked for example at 100° C. The following example gives an illustration of a nitrocellulose containing coating which is baked. Phthalic ricinoleic resin produced as above 9.6 parts by weight, low viscosity nitrocellulose 4.8 parts, butyl acetate 24 parts, butyl alcohol 9.6 parts, toluol 24 parts. This composition was used as a coating composition and applied to the desired surface. In this composition the ratio of resin to nitrocellulose is 2 to 1. The color of the solution is light and the coating dries readily on, for example, a well cleaned sheet of metal affording a good lacquer coating having excellent adhesion. On baking for half an hour at 100° C. the film did not become brittle. The surface was glossy, and there was no exudation of greasy material. Owing to the toughening and plasticizing effect of phthalic ricinoleic glyceride resins on nitrocellulose, no softening agent was required in this composition, but the film obtained was notably flexible.

One or more coatings of the desired composition containing the synthetic resins described above, either with or without other additions may be applied to the articles that receive such priming coatings. Further as indicated, the priming coatings containing synthetic resins and with or without nitrocellulose or other additions may be used as undercoats under various types of coatings. Oil paints, varnishes and enamels are illustrative of non-nitrocellulose containing or non-nitrocellulose derivative containing overcoats, which are of an oil base or drying oil character. The cellulose derivatives used as top coats include cellulose nitrates or acetates of various types and grades, other cellulose ester, cellulose ethers, etc. and compositions containing such ingredients.

Having thus described my invention, I claim:

1. An article of manufacture carrying a plurality of coating layers, one of which is a priming coat containing a natural resin-polybasic acid-polyhydric alcohol complex.

2. An article of manufacture carrying a plurality of coating layers, one of which is a priming coat containing a natural resin-polybasic acid-polyhydric alcohol complex and nitrocellulose.

3. An article of manufacture carrying a plurality of coating layers, one of which is a priming coat containing a natural resin-polybasic acid-polyhydric alcohol complex, and another of which is a lacquer coat.

4. An article of manufacture carrying a plurality of coating layers, one of which is a priming coat containing rosin phthalic glyceride.

5. An article of manufacture carrying a plurality of coating layers, one of which is a priming coat containing rosin phthalic glyceride and nitrocellulose.

6. An article of manufacture carrying a plurality of coating layers, one of which is a priming coat containing rosin phthalic glyceride, and another of which is a lacquer coat.

7. An article of manufacture carrying a plurality of coating layers, one of which is a priming coat containing rosin-linseed phthalic glyceride.

8. Sheet metal carrying a tightly adhering coating comprising as the primer coat a mixed ester having as the alcohol component a polyhydric alcohol and as the acid components a polybasic acid, a natural resin acid and acids obtainable by the hydrolysis of a drying oil, and over the primer coat a coating of pyroxylin lacquer.

9. Sheet metal carrying a tightly adhering coating comprising as the primer coat a mixed ester of glycerine having as the acid components a polybasic acid, a natural resin acid and acids obtainable by the hydrolysis of a drying oil, and over the primer a coating of pyroxylin lacquer.

10. An article of manufacture carrying a tightly adhering coating comprising as the primer coat a mixed ester having as the alcohol component a polyhydric alcohol and as the acid components a polybasic acid, a natural resin acid and acids obtainable by the hydrolysis of a drying oil, and over the primer coat a coating of pyroxylin lacquer.

11. An article of manufacture carrying a tightly adhering coating comprising as the primer coating a mixed ester of glycerine having as the acid components a polybasic acid, a natural resin acid and acids obtainable by the hydrolysis of a drying oil, and over the primer a coating of pyroxylin lacquer.

12. An article of manufacture carrying a plurality of coating layers, one of which is a priming coat containing a phthalic glyceride resin having a natural acid resin component and having a reacted component selected from the group including acids derived from fatty glycerides, and the fatty glycerides.

CARLETON ELLIS.